United States Patent [19]

Akiba

[11] Patent Number: 4,670,296
[45] Date of Patent: Jun. 2, 1987

[54] METHOD FOR PRODUCING A PHOSPHOR SCREEN OF A CATHODE RAY TUBE

[75] Inventor: Yukio Akiba, Shinagawa, Japan
[73] Assignee: Sony Corporation, Tokyo, Japan
[21] Appl. No.: 752,042
[22] PCT Filed: Oct. 25, 1984
[86] PCT No.: PCT/JP84/00507
 § 371 Date: Jun. 18, 1985
 § 102(e) Date: Jun. 18, 1985
[87] PCT Pub. No.: WO85/02056
 PCT Pub. Date: May 9, 1985

[30] Foreign Application Priority Data

Oct. 31, 1983 [JP] Japan ................ 58-203960

[51] Int. Cl.$^4$ ............................................. B05D 5/06
[52] U.S. Cl. .................................... 427/68; 427/64;
 427/73; 427/230; 427/264; 427/282; 427/287;
 430/25; 430/26
[58] Field of Search .................. 427/64, 68, 264, 287,
 427/230, 287, 282, 73; 430/25, 26

[56] References Cited

U.S. PATENT DOCUMENTS

| | | | |
|---|---|---|---|
| 3,544,354 | 12/1970 | Kachel | 427/68 |
| 3,558,310 | 1/1971 | Mayaud | 430/25 |
| 3,788,846 | 1/1974 | Mayaud et al. | 430/25 |
| 4,128,674 | 12/1978 | Hedler | 427/68 |
| 4,455,323 | 6/1984 | Ishizuka et al. | 427/73 |
| 4,513,024 | 4/1985 | Morita et al. | 427/68 |

Primary Examiner—Norman Morgenstern
Assistant Examiner—Janyce A. Bell
Attorney, Agent, or Firm—Hill, Van Santen, Steadman & Simpson

[57] ABSTRACT

The present invention is to positively provide a light pen pick-up phosphor pattern by the application of an inverting method and the selection of its slurry composition. That is, this invention relates to a method for producing a phosphor screen of a cathode ray tube which comprises the steps of forming a photo-sensitive material layer with a predetermined pattern on the inner surface of a cathode ray tube panel, coating on the whole surface of the panel including the photo-sensitive material layer with a phosphor slurry for use in light pen pick-up and removing the photo-sensitive material layer to thereby form a light pen pick-up phosphor pattern which is an inverted pattern of the former pattern. In this case, the phosphor slurry is made of silica and polyvinyl alcohol, wherein if an amount (weight) of silica is taken as S, an amount (weight) of solid component of polyvinyl alcohol is taken as B and an amount (weight) of phosphor is taken as P, the ratio S/B is selected in a range from 1 to 15 and the ratio S/B is selected in a range from 5 to 30.

2 Claims, 5 Drawing Figures

METHOD FOR PRODUCING A PHOSPHOR SCREEN OF A CATHODE RAY TUBE

DESCRIPTION

1. TECHNICAL FIELD

The present invention relates to a method for producing a phosphor screen of a cathode ray tube, particularly a phosphor screen of a cathode ray tube suitable for use as a cathode ray tube in which the light pen pick-up detection system is employed in a terminal display apparatus.

BACKGROUND ART

In a so-called character display apparatus for displaying a very small pattern such as character, symbol, figure and the like in a terminal display apparatus, in order to afford a reproduced picture image of high definition, a 2 field 1-frame interlaced scanning system is not used but a scanning system which sequentially scans the scanning lines is employed to avoid the scanning lines of each field being displaced from each other in position. In order to obtain a display screen which provides a frame number same as that of the prior art interlaced scanning system, the scanning speed of the electron beam must be twice as high as that of the prior art. This causes the signal band width to become large or causes the power required for the deflecting means to become large. Therefore, in the character display apparatus serving as the terminal display apparatus of this kind, the still picture is used very frequently so that the display screen is reenergized about 30 to 50 times per second. Accordingly, if the display apparatus of this kind uses a phosphor that is generally used in the prior art television picture tube of an interlaced scanning system, the picture image will flicker considerably. Therefore, a cathode ray tube of the apparatus of this kind uses as its phosphor a long-persistence phosphor whose decay time lies in a range from several milli seconds to several tens of milli seconds. However, if the address detection is carried out by a light pen as one of the using modes of use of the character display apparatus, since it is necessary that the moment when the electron beam passes through the phosphor screen must be detected by the light pen, in the range where an output is produced, the decay time of the phosphor must be as short as possible so as to increase the pick-up accuracy. Thus, a short-persistence phosphor which has a decay time on the order of a micro ($\mu$) second is necessary.

Generally, the decay time represents the time until the brightness at the initial light emission is decreased to 1/10 thereof.

As described above, the cathode ray tube of this kind requires a long-persistence phosphor to make a picture image which can be seen by naked eyes and a short-persistence phosphor to carry out the address detection by using a light pen because a detection pulse of very short time must be provided. Therefore, these requirements are conflicting with each other.

Accordingly, in the cathode ray tube of this kind, as the green and red phosphors which form its phosphor screen, for example, color phosphor screen, long-persistence phosphors are used while as the blue phosphor having relatively low visibility, a short-persistence phosphor is used. In this case, however, notwithstanding the low visibility of the blue phosphor, it is a short-persistence phosphor so that there is caused a slight flicker in the picture image, too.

In another prior art example, a long-persistence phosphor and a short-persistence phosphor of the color same as that of the long-persistence phosphor are mixed and used, in which the detecting means detects only the level at which both phosphors are rendered luminous at the same time. In this case, however, it is practically very difficult to select the mixture ratio of both of them such that the flicker of the picture image can be suppressed, while the pick-up accuracy can be increased. If the mixed amount of short-persistence phosphor is very large, the flicker of the picture image becomes conspicuous. If, on the other hand, it is small, the S/N grows worse to lower the pick-up accuracy of the light pen whereby the positive address detection will not be made without difficulty.

To overcome such shortcomings, it may be considered that a phosphor screen is formed by separately coating on the inner surface of the panel of a cathode ray tube phosphors with decay time of, for example, longer than 1 milli (m) second and to emit visible light, for example, light rays of red, green and blue colors by the impingement of an electron beam and a phosphor with decay time shorter than 10 micro ($\mu$) seconds and to emit a detecting light, for example, ultraviolet rays, infrared rays and so on by the impingement of electron beam for the light pen pick-up outside the area of visible light. More particularly, for example, the color phosphor screen, the phosphors which are respectively rendered luminous in red, green and blue are respectively formed to have a predetermined pattern of stripe-shape or dot-shape and the phosphor which emits the afore-mentioned light pen pick-up detecting light is formed such that it exists between the adjacent color phosphors as seen from the front of the phosphor panel of the cathode ray tube.

The present invention relates to a method for producing a phosphor screen of a cathode ray tube suitable in obtaining a phosphor screen in which in the space between the phosphors with the predetermined pattern of, for example, stripe-shape or dot-shape to emit the visible light, there is separately coated a phosphor to produce the light pen pick-up detecting light like the phosphor screen of the afore-mentioned light pen pick-up system cathode ray tube. Particularly this invention is to provide a method for producing a phosphor screen of a cathode ray tube by which its phosphor pattern, particularly the phosphor pattern for the light pen pick-up use can be produced positively.

DISCLOSURE OF INVENTION

A method for producing a phosphor screen of a cathode ray tube according to the present invention comprises the steps of forming a photo-sensitive material layer with a predetermined pattern on the inner surface of a cathode ray tube panel, coating over the whole surface of the panel including the photo-sensitive material layer with a phosphor slurry for use in light pen pick-up and removing the photo-sensitive material layer to thereby form a light pen pick-up phosphor pattern with a pattern which is the reversal pattern to that of the photo-sensitive material layer, the composition of the phosphor slurry being selected such that it contains silica and polyvinyl alcohol, wherein if the amount (weight) of silica is taken as S, the amount (weight) of solid component of polyvinyl alcohol is taken as B and the amount (weight) of phosphor is taken as P, ratio S/B is selected in a range from 1 to 15 and ratio P/B is selected in a range from 5 to 30.

BEST MODE FOR CARRYING OUT THE INVENTION

Figure 1:
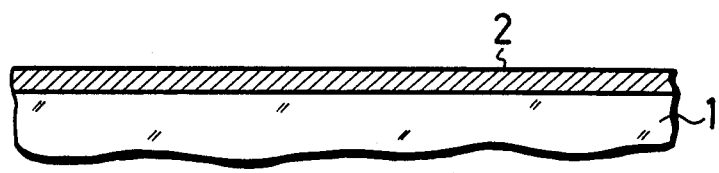
FIGS. 1 to 5 are respectively process diagrams showing an embodiment of a method for producing a color phosphor screen of a cathode ray tube according to the present invention.

An embodiment of a method for producing a color phosphor screen of a cathode ray tube of a light pen pick-up system according to this invention will be described in detail with reference to the drawing.

Referring to the figures, reference numeral 1 designates a panel or a face plate of a cathode ray tube on which a phosphor screen is to be formed. As shown in FIG. 1, on the whole inner surface of the panel 1, there is coated and formed a photo-sensitive material layer 2 which is made of polyvinyl alcohol (PVA) and ammonium dichromate (ADC).

Though not shown, an electron beam landing position determining means, for example, an aperture grille formed of a large number of slits aligned in parallel to be disposed in response to the panel 1, for example, in opposing relation to the phosphor screen of a cathode ray tube which is finally obtained is disposed with the positional relation same as that of the cathode ray tube to be finally made and then used as a mask to expose the photo-sensitive material layer. In other words, an electron beam corresponding to each color of the final cathode ray tube is substituted for a light which is used to expose the photo-sensitive material layer.

Figure 2:
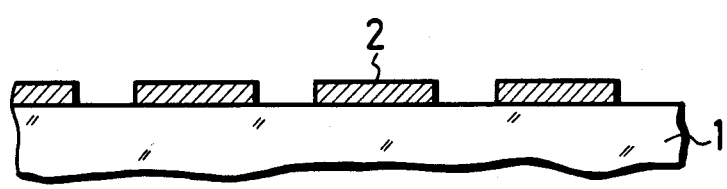

The photo-sensitive material layer 2 is developed and other portions than the exposed portions are removed as shown in FIG. 2. As mentioned above, the stripes of the photo-sensitive material layer 2 are formed.

Figure 3:
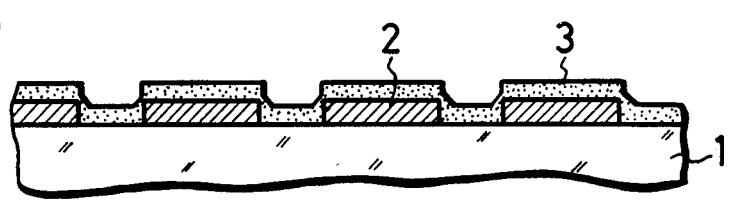
Figure 4:
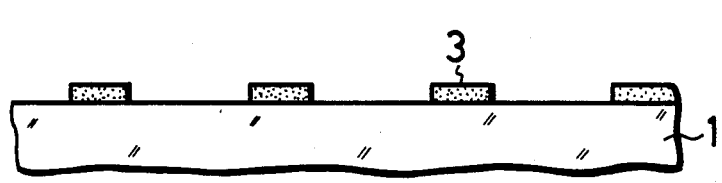

Thereafter, as shown in FIG. 3, on the whole surface of the panel including the photo-sensitive material layer 2 formed as the pattern, there is formed a phosphor layer 3 made of slurry of the phosphor which emits infrared rays or ultraviolet rays for light pen pick-up and as shown in FIG. 4, the photo-sensitive material layer 2 is removed by its solvent, i.e., an inverting agent such as hydrogen peroxide ($H_2O_2$) solution. Thus, since the photo-sensitive material layer 2 is removed, the phosphor layer 3 formed thereon is selectively removed, or lifted-off so that the phosphor slurry of only the portion, i.e., the phosphor layer 3 which is directly deposited on the inner surface of the panel 1 is left. In other words, a stripe pattern of the phosphor layer 3 which is the inverted stripe pattern of the photosensitive material layer 2 is formed.

Figure 5:
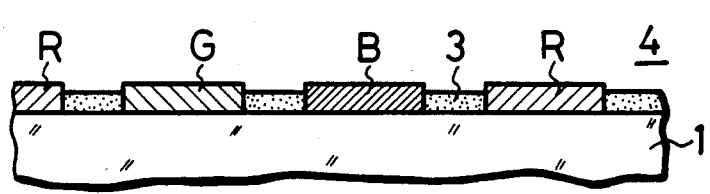

After that, as shown in FIG. 5, according to the known method, red, green and blue phosphor stripes R, G and B are respectively formed between the phosphor layers 3 of stripe-shape for use in light pen pick-up, thus a desired color phosphor screen 4 is formed.

As described above, in the present invention, the pattern of the phosphor layer 3 for use in light pen pick-up is formed by the inversion of the photo-sensitive material layer. According to this inverting method, i.e., so-called lift-off method, the inverted pattern can not be obtained by the composition of the general phosphor slurry. In this connection, while this inverting method is used to coat a carbon layer which forms a so-called black stripe in the phosphor screen of a color cathode ray tube such as a general television picture tube, this method can not be applied to the general prior art phosphor slurry. That is, as compared with a carbon coating material in which the particle diameter of carbon is less than 0.5 $\mu m$, the specific gravity thereof is about 2 and the coated thickness thereof is less than 1 $\mu m$, the particle diameter of phosphor of a general phosphor slurry is in a range from 5 to 10 $\mu m$ and the specific gravity thereof is around 4. Accordingly, due to problems of aggregation, sedimentation and so on, in the present invention, a special composition is selected for the phosphor slurry which makes the phosphor layer 3 described in connection with FIG. 3.

That is, in the present invention, the phosphor slurry for use in light pen pick-up is made of phosphor, colloidal silica, binder of PVA as a thickening agent in consideration of the coagulation and sedimentation of phosphor and water. The reason why the silica is added is because not only the portion of the phosphor slurry on the photo-sensitive material layer 2 but also the portion of the phosphor layer 3 which is directly coated on the panel 1 and is to remain finally are removed by the treatment of the inverting agent, $H_2O_2$ for the photo-sensitive material layer 2 made of PVA and ADC by the fact that the PVA is used as the binder. As an example of the phosphor slurry, the following one can be enumerated.

| | |
|---|---|
| phosphor | 100 g |
| pure water | 150 ml |
| coloidal silica (aqueous solution containing 30 weight % of silica whose product name is LUDOX manufactured by The Du Pont Company) | 140 ml |
| PVA (aqueous solution containing 8 weight % of PVA whose product name is GOTHENOL manufactured by Nippon Synthetic Chemical Industries Co., Ltd.) | 150 g |

In this phosphor slurry, the ratio S/B between the amount S of silica and the amount B of PVA is selected in a range from 1 to 15 and a ratio P/B between the amount P of phosphor and the amount B of PVA is selected in a range from 5 to 30. The reason why the ratio S/B is selected in the range from 1 to 15 is that if S/B is less than 1, the bonding force is lowered, while if S/B exceeds 15, the inverting property is lowered. Further, the reason why P/B is selected in the range from 5 to 30 is that if P/B is less than 5, the packing density of the phosphor is too low, while if it exceeds 30, the keeping quality of the coating layer is lowered.

While in the above-described embodiment the photo-sensitive material layer is made of ADC and PVA, it is possible to use photo-sensitive material of an azide system.

While in the afore-mentioned embodiment the present invention is applied to provide the color phosphor screen, it is possible to apply this invention to provide a monochromatic phosphor screen. Also in this case, it is possible to form a phosphor screen in which the phosphor capable of producing a visible image is formed to have a pattern of, for example, stripe-shape and a phosphor stripe which emits ultraviolet or infrared rays for use in light pen pick-up is located between these stripes.

As set forth above, according to this invention, the phosphor screen in which the phosphors for the visible light and the phosphor for producing the light pen pick-up detecting light outside the visible area are separately formed can be obtained by the application of the inverting method to the light pen pick-up phosphor and the selection of the composition of its slurry, positively. Since in the resultant phosphor screen the phosphor for producing a visible light may be the phosphor whose decay time is relatively long and the phosphor for producing infrared rays or ultraviolet rays outside the visible area as the light pen pick-up detecting light may be the phosphor whose decay time is relatively short, a flicker can be avoided from ocurring on the picture screen and the address detection can be carried out with high sensitivity, thus resulting in a great practical advantage.

I claim:

1. A method for producing a phosphor screen on a cathode ray tube which comprises:

forming a photo-sensitive material layer in a predetermined pattern on the inner surface of a cathode ray tube panel, said pattern including spaced raised portions separated by void spaces on said panel, coating the inner surface of said panel including said spaced raised portions and said void spaces with a first phosphor slurry containing a phosphor capable of being detected by a light pen pick-up, removing the photo-sensitive material layer and its overlying phosphor layer while leaving a phosphor layer adhering to said panel which is detectable by a light pen pick-up and is an inversion of the original pattern, and forming a visible color emitting phosphor pattern between the pattern of light-pen sensitive phosphor from second phosphor slurries containing visible phosphors, said first phosphor slurry containing silica, polyvinyl alcohol and a phosphor, the weight ratio of silica to polyvinyl alcohol solids being from 1 to 15, and the weight ratio of phosphor to polyvinyl alcohol solids being from 5 to 30, thereby improving the adhesion of the light pen pick-up phosphor pattern to the inner surface of said panel.

2. A method according to claim 1 wherein said phosphor layer emits light outside the visible spectrum upon excitation by an electron beam.

* * * * *